(12) United States Patent
Ashino

(10) Patent No.: US 12,732,428 B2
(45) Date of Patent: Sep. 8, 2026

(54) ANALYSIS DEVICE, ANALYSIS METHOD, AND STORAGE MEDIUM

(71) Applicant: NEC Corporation, Tokyo (JP)

(72) Inventor: Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 55 days.

(21) Appl. No.: 18/716,981

(22) PCT Filed: Dec. 14, 2021

(86) PCT No.: PCT/JP2021/046026
§ 371 (c)(1),
(2) Date: Jun. 6, 2024

(87) PCT Pub. No.: WO2023/112141
PCT Pub. Date: Jun. 22, 2023

(65) Prior Publication Data
US 2025/0039050 A1 Jan. 30, 2025

(51) Int. Cl.
*H04L 41/0866* (2022.01)
*H04L 43/08* (2022.01)

(52) U.S. Cl.
CPC .......... *H04L 41/0866* (2013.01); *H04L 43/08* (2013.01)

(58) Field of Classification Search
CPC . H04L 63/1425; H04L 63/1441; H04L 63/20; H04L 63/0876
See application file for complete search history.

(56) References Cited

U.S. PATENT DOCUMENTS 9,679,426 B1 * 6/2017 Jones-Mcfadden ...... H04B 5/77
11,122,040 B1 * 9/2021 Sun ..................... H04L 63/0876
2016/0344693 A1 * 11/2016 Wetterwald ........... H04L 61/103
(Continued)

FOREIGN PATENT DOCUMENTS

JP H10-032806 A 2/1998
JP 2002-325077 A 11/2002
(Continued)

OTHER PUBLICATIONS

International Search Report for PCT Application No. PCT/JP2021/046026, mailed on Feb. 15, 2022.

*Primary Examiner* — Chirag R Patel

(57) ABSTRACT

Provided is an analysis device that is capable of easily detecting, by using only communication data, a change in another communicatively connected communication device, or a change in a configuration of a communication network that is connected to the other communication device. First communication feature information that has been generated based on communication data over a predetermined time period with another communication device that is connected to the communication network, and second communication feature information that has been generated based on new communication data over a predetermined time period with the other communication device that is connected to the communication network, are compared to determine the presence or absence of a similarity in the communication feature information. A determination result indicating the presence or absence of a change relating to the communication network is output based on the presence or absence of the similarity.

9 Claims, 17 Drawing Sheets

(56) References Cited

U.S. PATENT DOCUMENTS

2018/0012134 A1* 1/2018 Shetye .................. H04L 63/102
2020/0092296 A1* 3/2020 Brinckman ......... H04W 12/086
2021/0255943 A1 8/2021 Noguchi et al.
2021/0281609 A1* 9/2021 Crabtree ................. H04L 63/20
2023/0068641 A1* 3/2023 Lu ......................... H04W 76/10

FOREIGN PATENT DOCUMENTS

JP 2006-287299 A 10/2006
JP 2008-287542 A 11/2008
JP 2009-199556 A 9/2009
JP 2020-065153 A 4/2020
JP 6930663 B2 9/2021

* cited by examiner

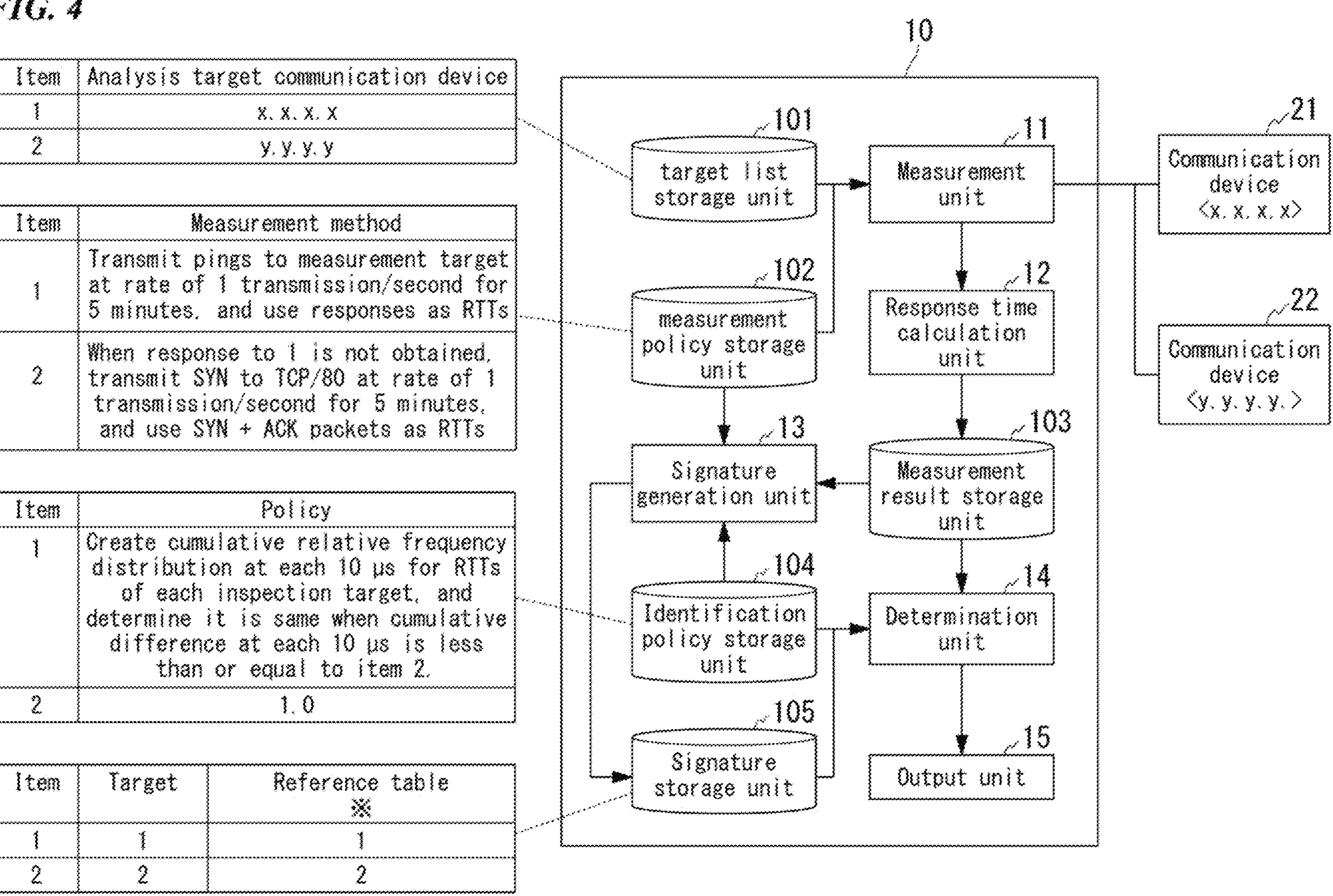
FIG. 4
10
101 target list storage unit
11 Measurement unit
21 Communication device <x.x.x.x>
22 Communication device <y.y.y.y.>
102 measurement policy storage unit
12 Response time calculation unit
13 Signature generation unit
103 Measurement result storage unit
104 Identification policy storage unit
14 Determination unit
105 Signature storage unit
15 Output unit
Item | Analysis target communication device
1 | x.x.x.x
2 | y.y.y.y
Item | Measurement method
1 | Transmit pings to measurement target at rate of 1 transmission/second for 5 minutes, and use responses as RTTs
2 | When response to 1 is not obtained, transmit SYN to TCP/80 at rate of 1 transmission/second for 5 minutes, and use SYN + ACK packets as RTTs
Item | Policy
1 | Create cumulative relative frequency distribution at each 10 μs for RTTs of each inspection target, and determine it is same when cumulative difference at each 10 μs is less than or equal to item 2.
2 | 1.0
Item | Target | Reference table ※
1 | 1 | 1
2 | 2 | 2

| μs | Frequency | Cumulative frequency | Cumulative relative frequency |
|---|---|---|---|
| 210 | 1 | 1 | 0.001 |
| 220 | 3 | 4 | 0.005 |
| 230 | 18 | 22 | 0.025 |
| 240 | 48 | 70 | 0.080 |
| 250 | 101 | 171 | 0.196 |
| 260 | 80 | 251 | 0.287 |
| 270 | 118 | 369 | 0.422 |
| 280 | 101 | 470 | 0.538 |
| 290 | 85 | 555 | 0.635 |
| 300 | 62 | 617 | 0.706 |
| 310 | 45 | 662 | 0.757 |
| 320 | 40 | 702 | 0.803 |
| 330 | 25 | 727 | 0.832 |
| 340 | 39 | 766 | 0.876 |
| 350 | 20 | 786 | 0.899 |
| 360 | 18 | 804 | 0.920 |
| 370 | 17 | 821 | 0.939 |
| 380 | 8 | 829 | 0.949 |
| 390 | 6 | 835 | 0.955 |
| 400 | 7 | 842 | 0.963 |
| 410 | 4 | 846 | 0.968 |
| 420 | 7 | 853 | 0.976 |
| 430 | 4 | 857 | 0.981 |
| 440 | 5 | 862 | 0.986 |
| 450 | 4 | 866 | 0.991 |
| 460 | 1 | 867 | 0.992 |
| 470 | 2 | 869 | 0.994 |
| 530 | 1 | 870 | 0.995 |
| 570 | 1 | 871 | 0.997 |
| 590 | 1 | 872 | 0.998 |
| 670 | 1 | 873 | 0.999 |
| 850 | 1 | 874 | 1.000 |

*FIG. 8*

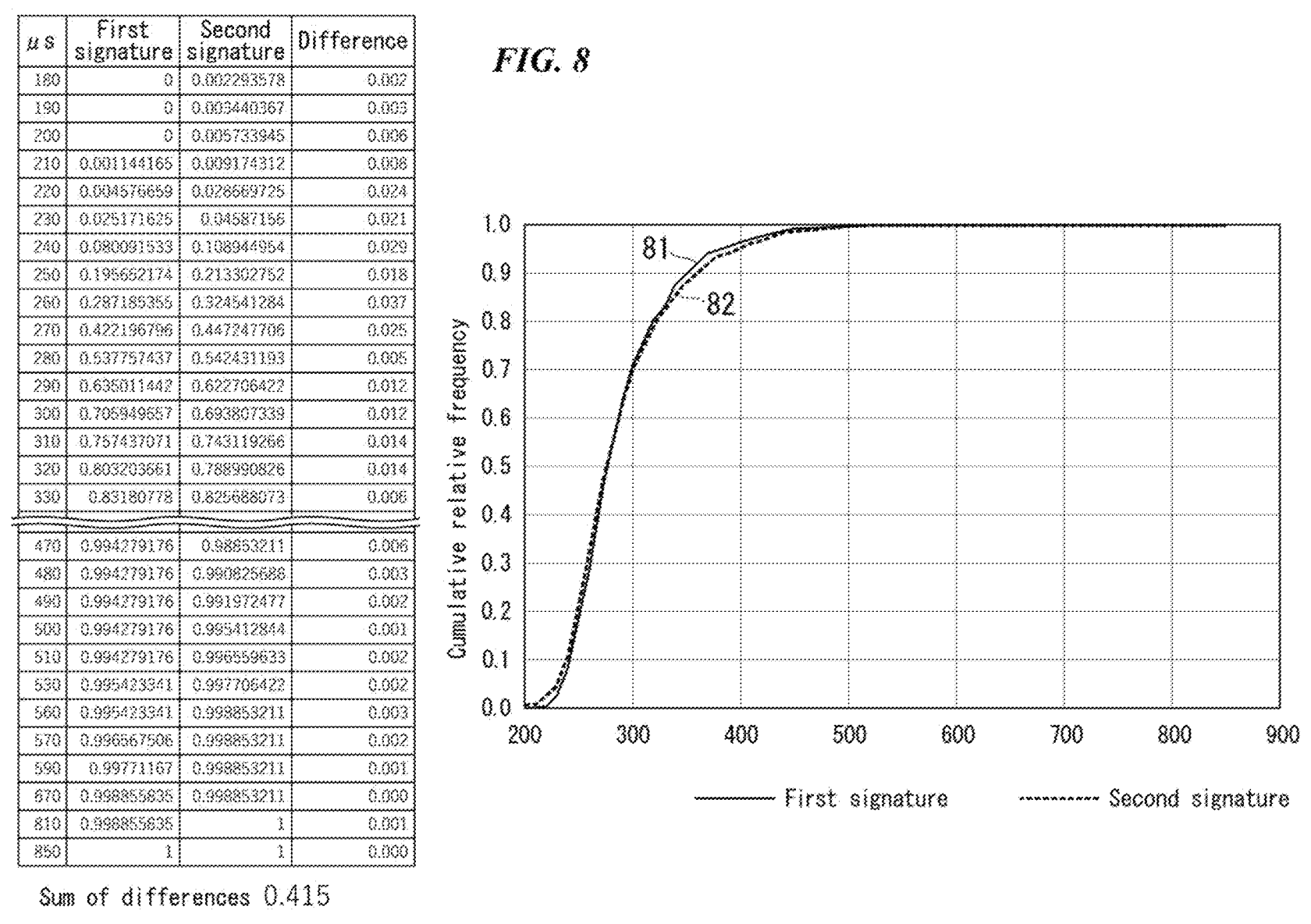

| μs | First signature | Second signature | Difference |
|---|---|---|---|
| 180 | 0 | 0.002293578 | 0.002 |
| 190 | 0 | 0.003440367 | 0.003 |
| 200 | 0 | 0.005733945 | 0.006 |
| 210 | 0.001144165 | 0.009174312 | 0.008 |
| 220 | 0.004576659 | 0.028669725 | 0.024 |
| 230 | 0.025171625 | 0.04587156 | 0.021 |
| 240 | 0.080091533 | 0.108944954 | 0.029 |
| 250 | 0.195652174 | 0.213302752 | 0.018 |
| 260 | 0.287185355 | 0.324541284 | 0.037 |
| 270 | 0.422196796 | 0.447247706 | 0.025 |
| 280 | 0.537757437 | 0.542431193 | 0.005 |
| 290 | 0.635011442 | 0.622706422 | 0.012 |
| 300 | 0.705949657 | 0.693807339 | 0.012 |
| 310 | 0.757437071 | 0.743119266 | 0.014 |
| 320 | 0.803203661 | 0.788990826 | 0.014 |
| 330 | 0.83180778 | 0.825688073 | 0.006 |
| 470 | 0.994279176 | 0.98853211 | 0.006 |
| 480 | 0.994279176 | 0.990825688 | 0.003 |
| 490 | 0.994279176 | 0.991972477 | 0.002 |
| 500 | 0.994279176 | 0.995412844 | 0.001 |
| 510 | 0.994279176 | 0.996559633 | 0.002 |
| 530 | 0.995423341 | 0.997706422 | 0.002 |
| 560 | 0.995423341 | 0.99853211 | 0.003 |
| 570 | 0.996567506 | 0.99853211 | 0.002 |
| 590 | 0.99771167 | 0.99853211 | 0.001 |
| 670 | 0.998855835 | 0.99853211 | 0.000 |
| 810 | 0.998855835 | 1 | 0.001 |
| 850 | 1 | 1 | 0.000 |

Sum of differences 0.415

| μs | First signature | Second signature |
|---|---|---|
| 180 | 0 | 0.000 |
| 190 | 0 | 0.000 |
| 200 | 0 | 0.000 |
| 210 | 0.001144 | 0.000 |
| 220 | 0.004577 | 0.000 |
| 230 | 0.025172 | 0.000 |
| 240 | 0.080092 | 0.001002 |
| 250 | 0.195652 | 0.004008 |
| 260 | 0.287185 | 0.008016 |
| 270 | 0.422197 | 0.018036 |
| 280 | 0.537757 | 0.042084 |
| 290 | 0.635011 | 0.098196 |
| 300 | 0.70595 | 0.159319 |
| 310 | 0.757437 | 0.228457 |
| 320 | 0.803204 | 0.286573 |
| 330 | 0.831808 | 0.350701 |
| 520 | 0.994279 | 0.960922 |
| 530 | 0.995423 | 0.971944 |
| 540 | 0.995423 | 0.982966 |
| 550 | 0.995423 | 0.98998 |
| 560 | 0.995423 | 0.99499 |
| 570 | 0.996568 | 0.997996 |
| 580 | 0.996568 | 0.998998 |
| 590 | 0.997712 | 0.998998 |
| 630 | 0.997712 | 1 |
| 670 | 0.998856 | 1 |
| 810 | 0.998856 | 1 |
| 850 | 1 | 1 |

Sum of differences 8.660

| Analysis target | Result |
|---|---|
| x.x.x.x | No change |
| y.y.y.y | Change |

| Observed value | Frequency | Cumulative frequency | Cumulative relative frequency |
|---|---|---|---|
| 210 | 1 | 1 | 0.0011 |
| 220 | 3 | 4 | 0.0046 |
| 230 | 18 | 22 | 0.0252 |
| 240 | 48 | 70 | 0.0801 |
| 250 | 101 | 171 | 0.1957 |
| 260 | 80 | 251 | 0.2872 |
| 270 | 118 | 369 | 0.4222 |
| 280 | 101 | 470 | 0.5378 |
| 290 | 85 | 555 | 0.6350 |
| 300 | 62 | 617 | 0.7059 |
| 310 | 45 | 662 | 0.7574 |
| 320 | 40 | 702 | 0.8032 |
| 330 | 25 | 727 | 0.8318 |
| 340 | 39 | 766 | 0.8764 |
| 350 | 20 | 786 | 0.8993 |
| 360 | 18 | 804 | 0.9199 |
| 370 | 17 | 821 | 0.9394 |
| 380 | 8 | 829 | 0.9485 |
| 390 | 6 | 835 | 0.9554 |
| 400 | 7 | 842 | 0.9634 |
| 410 | 4 | 846 | 0.9680 |
| 420 | 7 | 853 | 0.9760 |
| 430 | 4 | 857 | 0.9805 |
| 440 | 5 | 862 | 0.9863 |
| 450 | 4 | 866 | 0.9908 |
| 460 | 1 | 867 | 0.9920 |
| 470 | 2 | 869 | 0.9943 |
| 530 | 1 | 870 | 0.9954 |
| 570 | 1 | 871 | 0.9966 |
| 590 | 1 | 872 | 0.9977 |
| 670 | 1 | 873 | 0.9989 |
| 850 | 1 | 874 | 1.0000 |

Correction time(s)

| Observed value | Frequency | Cumulative frequency | Cumulative relative frequency |
|---|---|---|---|
| 377 | 1 | 1 | 0.0011 |
| 387 | 3 | 4 | 0.0046 |
| 397 | 18 | 22 | 0.0252 |
| 407 | 48 | 70 | 0.0801 |
| 417 | 101 | 171 | 0.1957 |
| 427 | 80 | 251 | 0.2872 |
| 437 | 118 | 369 | 0.4222 |
| 447 | 101 | 470 | 0.5378 |
| 457 | 85 | 555 | 0.6350 |
| 467 | 62 | 617 | 0.7059 |
| 477 | 45 | 662 | 0.7574 |
| 487 | 40 | 702 | 0.8032 |
| 497 | 25 | 727 | 0.8318 |
| 507 | 39 | 766 | 0.8764 |
| 517 | 20 | 786 | 0.8993 |
| 527 | 18 | 804 | 0.9199 |
| 537 | 17 | 821 | 0.9394 |
| 547 | 8 | 829 | 0.9485 |
| 557 | 6 | 835 | 0.9554 |
| 567 | 7 | 842 | 0.9634 |
| 577 | 4 | 846 | 0.9680 |
| 587 | 7 | 853 | 0.9760 |
| 597 | 4 | 857 | 0.9805 |
| 607 | 5 | 862 | 0.9863 |
| 617 | 4 | 866 | 0.9908 |
| 627 | 1 | 867 | 0.9920 |
| 637 | 2 | 869 | 0.9943 |
| 697 | 1 | 870 | 0.9954 |
| 737 | 1 | 871 | 0.9966 |
| 757 | 1 | 872 | 0.9977 |
| 837 | 1 | 873 | 0.9989 |
| 1017 | 1 | 874 | 1.0000 |

| RTT | First signature | Second signature |
|---|---|---|
| 270 | 0.005 | 0 |
| 280 | 0.013 | 0 |
| 290 | 0.033 | 0.001 |
| 300 | 0.067 | 0.003 |
| 310 | 0.097 | 0.007 |
| 320 | 0.137 | 0.009 |
| 330 | 0.181 | 0.018 |
| 340 | 0.208 | 0.022 |
| 350 | 0.228 | 0.027 |
| 360 | 0.248 | 0.03 |
| 370 | 0.271 | 0.039 |
| 380 | 0.306 | 0.062 |
| 390 | 0.338 | 0.088 |
| 400 | 0.369 | 0.136 |
| 410 | 0.396 | 0.227 |
| 420 | 0.415 | 0.28 |
| 750 | 0.984 | 0.866 |
| 760 | 0.993 | 0.886 |
| 770 | 0.995 | 0.934 |
| 780 | 0.996 | 0.969 |
| 790 | 0.997 | 0.987 |
| 800 | 0.997 | 0.995 |
| 810 | 0.997 | 0.996 |
| 820 | 0.997 | 0.997 |
| 1600 | 0.998 | 0.997 |
| 1770 | 0.998 | 0.998 |
| 2540 | 0.998 | 0.999 |
| 2570 | 0.998 | 1 |
| 2670 | 0.999 | 1 |
| 2920 | 1 | 1 |

Sum of differences 7.103

FIG. 15

1 Communication device

2 Communication device

3

Time

| Communication device α | Result |
|---|---|
| | Normal |

| Communication network | Result |
|---|---|
| ○ Month × Day 10:00 | No change |
| ○ Month × Day 11:00 | Change |
| ○ Month × Day 12:00 | No change |
| ○ Month × Day 13:00 | No change |

10≤

Time

200ms

250ms

300ms

ANALYSIS DEVICE, ANALYSIS METHOD, AND STORAGE MEDIUM

This application is a National Stage Entry of PCT/JP2021/46026 filed on Dec. 14, 2021, the contents of all of which are incorporated herein by reference, in their entirety.

TECHNICAL FIELD

The present invention relates to an analysis device, an analysis method, and a storage medium.

BACKGROUND ART

A change in another communicatively connected communication device or a change in the configuration of a communication network that is connected to another communication device can be detected by a change in a MAC address or an IP address of the other communicatively connected communication device, or the other communication devices constituting the communication network. However, MAC addresses and IP addresses can sometimes be rewritten by a relay device. In the case where the MAC addresses and IP addresses are rewritten, a change in the other communicatively connected communication device or a change in the configuration of the communication network that is connected to the other communication device cannot be easily detected.

In terms of the problem of increased processing load for identifying IoT (Internet of Things) devices, Patent Document 1 discloses a technique of identifying an unknown device as a known device by periodically extracting a feature amount of the unknown device, and then matching a change pattern of the feature amount of the device with the change pattern of the known device.

PRIOR ART DOCUMENTS

Patent Documents

Patent Document 1: Japanese Patent No. 6930663

SUMMARY OF THE INVENTION

Problems to be Solved by the Invention

Here, a technique that is capable of detecting, by using only communication data, a change in another communicatively connected communication device, or a change in a configuration of a communication network that is connected to the another communication device is being sought.

Therefore, an example object of the present invention is to provide an analysis device, an analysis method, and a storage medium that are capable of solving the above problem.

Means for Solving the Problem

According to a first example aspect of the invention, an analysis device includes: a determination means that compares first communication feature information that has been generated based on communication data over a predetermined time period with another communication device that is connected to a communication network, and second communication feature information that has been generated based on new communication data over the predetermined time period with the other communication device that is connected to the communication network to determine a presence or absence of a similarity in the communication feature information; and an output means that outputs a determination result indicating a presence or absence of a change relating to the communication network based on the presence or absence of the similarity.

According to a second example aspect of the invention, an analysis method includes: comparing first communication feature information that has been generated based on communication data over a predetermined time period with another communication device that is connected to a communication network, and second communication feature information that has been generated based on new communication data over the predetermined time period with the other communication device that is connected to the communication network to determine a presence or absence of a similarity in the communication feature information; and outputting a determination result indicating a presence or absence of a change relating to the communication network based on the presence or absence of the similarity.

According to a third example aspect of the invention, a program causes a computer of an analysis device to perform functions of: a determination means that compares first communication feature information that has been generated based on communication data over a predetermined time period with another communication device that is connected to a communication network, and second communication feature information that has been generated based on new communication data over the predetermined time period with the other communication device that is connected to the communication network to determine a presence or absence of a similarity in the communication feature information; and an output means that outputs a determination result indicating a presence or absence of a change relating to the communication network based on the presence or absence of the similarity.

Effect of Invention

According to the present invention, it is possible to provide an analysis device that is capable of easily detecting, by using only communication data, a change in another communicatively connected communication device, or a change in a configuration of a communication network that is connected to the other communication device.

BRIEF DESCRIPTION OF THE DRAWINGS

FIG. 4 is a functional block diagram of an analysis device according to the present example embodiment.

FIG. 8 is a first diagram showing a processing summary of a comparison between a first signature and a second signature.

FIG. 15 is a diagram showing an example of visual information included in output information according to the fourth example embodiment.

FIG. 16 is a diagram showing an example of output information according to the fourth example embodiment.

EXAMPLE EMBODIMENT

Hereunder, a communication network to which a communication device including an analysis device according to an example embodiment of the present invention connects will be described with reference to the drawings.

Figure 1:
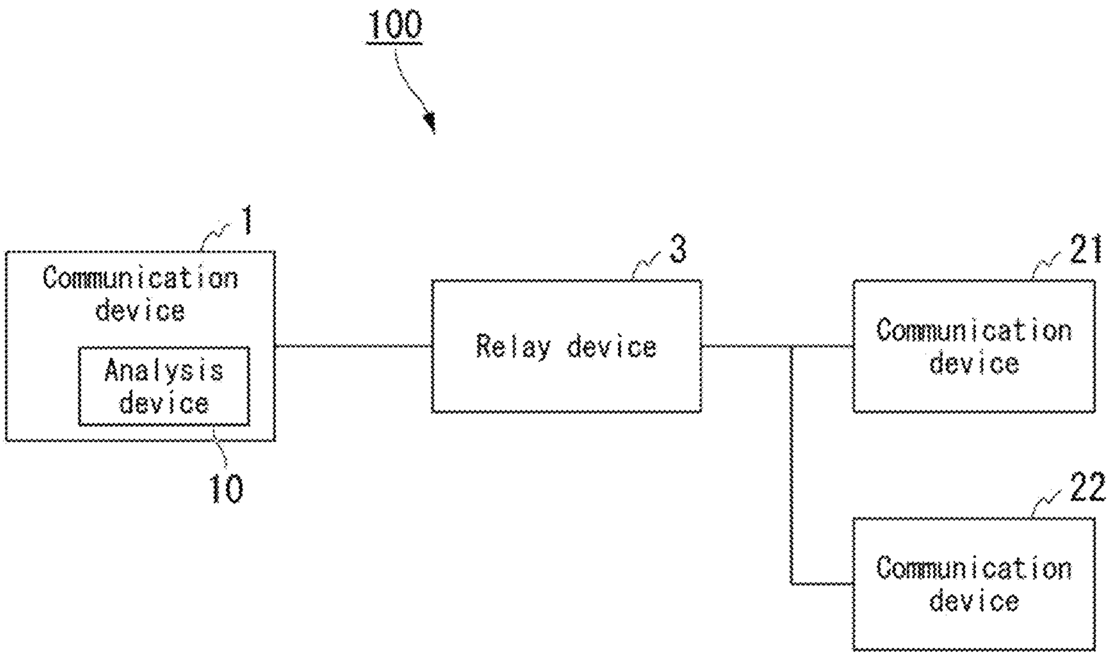
FIG. 1 is a diagram showing a communication device including an analysis device according to the present example embodiment, and a communication network to which the communication device connects.

FIG. 1 is a diagram showing a communication device including an analysis device according to the present example embodiment, and a communication network 100 to which the communication device connects. In the communication network 100 shown in FIG. 1, a communication device 1 including an analysis device 10 is communicatively connected via a relay device 3 to other communication devices 21 and 22 that are targeted for analysis. The other communication devices 21 and 22 are collectively referred to as communication devices 2.

The analysis device 10 is provided inside the communication device 1. The analysis device 10 stores first communication feature information that has been generated based on communication data over a predetermined time period with the communication device 21 that is targeted for analysis. The analysis device 10 stores second communication feature information that has been generated based on new communication data over a predetermined time period with the communication device 21. The analysis device 10 compares the first communication feature information and the second communication feature information, determines the presence or absence of a similarity between the communication feature information, and indicates the presence or absence of a change relating to the communication network 100 based on the presence or absence of the similarity. In this case, a change relating to the communication network 100 indicates the presence or absence of a change in whether or not the communication device 21 is different from the device that was previously connected to the communication network 100. Furthermore, the analysis device 10 stores first communication feature information that that has been generated based on communication data over a predetermined time period with the communication device 22 that is targeted for analysis. The analysis device 10 stores second communication feature information that has been generated based on new communication data over a predetermined time period with the communication device 22. The analysis device 10 compares the first communication feature information and the second communication feature information with the communication device 22, determines the presence or absence of a similarity between the communication feature information, and indicates the presence or absence relating to the communication network 100 based on the presence or absence of the similarity. In this case, a change relating to the communication network 100 indicates the presence or absence of a change in whether or not the communication device 22 is different from the device that was previously connected to the communication network 100.

Figure 2:
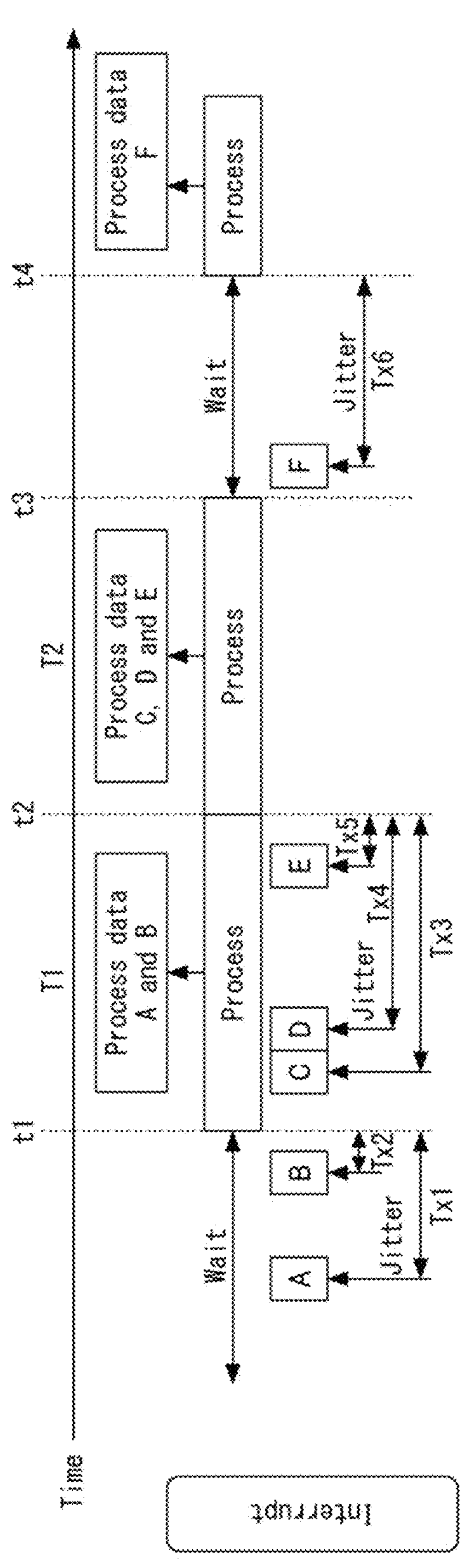
FIG. 2 is a diagram describing a delay relating to the response of a communication device that is targeted for analysis according to the present example embodiment.

FIG. 2 is a diagram describing a delay relating to the response of a communication device that is targeted for analysis.

In the communication device 2 targeted for analysis, a response is returned based on the communication data from the communication device 1. The timing of the response differs depending on the time due to interrupt processing and the like in the communication device 2. For example, interrupt processing occurs in the communication device 2 as shown in FIG. 2. As an example, in the communication device 2, communication data A, B, C, D, E and F are received in this order from the communication device 1. Here, it is assumed that the communication data A, B, C, D, E and F are pings. The communication device 2 collectively performs the processing relating to the communication data in predetermined time units. As a result, the communication device 2 waits until a processing start time t1 to perform the response processing of the communication data A and B, and performs the response processing in a time period T1 from the processing start time t1 up to the next processing start time t2. That is to say, in the communication device 2, a jitter Tx1 occurs until the processing start time t1 of the response processing for the communication data A, and a jitter Tx2 occurs until the processing start time t1 of the response processing for the communication data B. In the time period T1, the communication device 2 performs the responses (ping responses) to the communication data A and the communication data B with respect to the communication device 1 in the order the communication data was received. Furthermore, in the case where the communication device 2 receives the communication data C, D and E during the time period T1, it waits until the next processing start time t2 to perform the response processing of the communication data C, D and E. The communication device 2 waits until the processing start time t2 to perform the response processing of the communication data C, D and E, and performs the response processing in a time period T2 from the processing start time t2 up to the next processing start time t3. That is to say, in the communication device 2, a jitter Tx3 occurs until the processing start time t2 of the response processing for the communication data C, a jitter Tx4 occurs until the processing start time t2 of the response processing for the communication data D, and a jitter Tx5 occurs until the processing start time t2 of the response processing for the communication data E. In the time period T2, the communication device 2 performs the responses (ping responses) to the communication data C, D and E with respect to the communication device 1 in the order the communication data was received. Furthermore, in the case where the communication device 2 receives the communication data F during a time period after the time period T2, it waits until the next processing start time t4 to perform the response processing of the communication data F. The communication device 2 waits until the processing start time t4 to perform the response processing of the communication data F, and performs the response processing in a time period T3 from the processing start time t4 up to the next processing start time. That is to say, in the communication device 2, a jitter Tx6 occurs until the processing start time t4 of the response processing for the communication data F. The communication device 2 performs the response (ping response) to the communication data F with respect to the communication device 1 in the time period T3. The jitters Tx1 to Tx6 mentioned above are all different. Therefore, the responses to the pings transmitted by the communication device 1 to the communication device 2 targeted for analysis become more delayed as the jitter time of the ping transmitted from the communication device 1 increases. As a result, a deviation occurs in the response time, which is from the transmission time of the communication data at which the ping or the like is transmitted by the communication device 1 until the response is received. The response time may also occur due to factors other than the jitter time mentioned above in the communication device 2 targeted for analysis. For example, factors relating to the communication device 2 targeted for analysis, such as the performance of the network interface card, the performance of the kernel, and the operation state of the application software being used, can cause a delay in the transmission of a response signal by the communication device 2. Therefore, the communication feature information generated based on a variation in the response time mentioned above represents a unique feature of each communication device 2.

Figure 3:
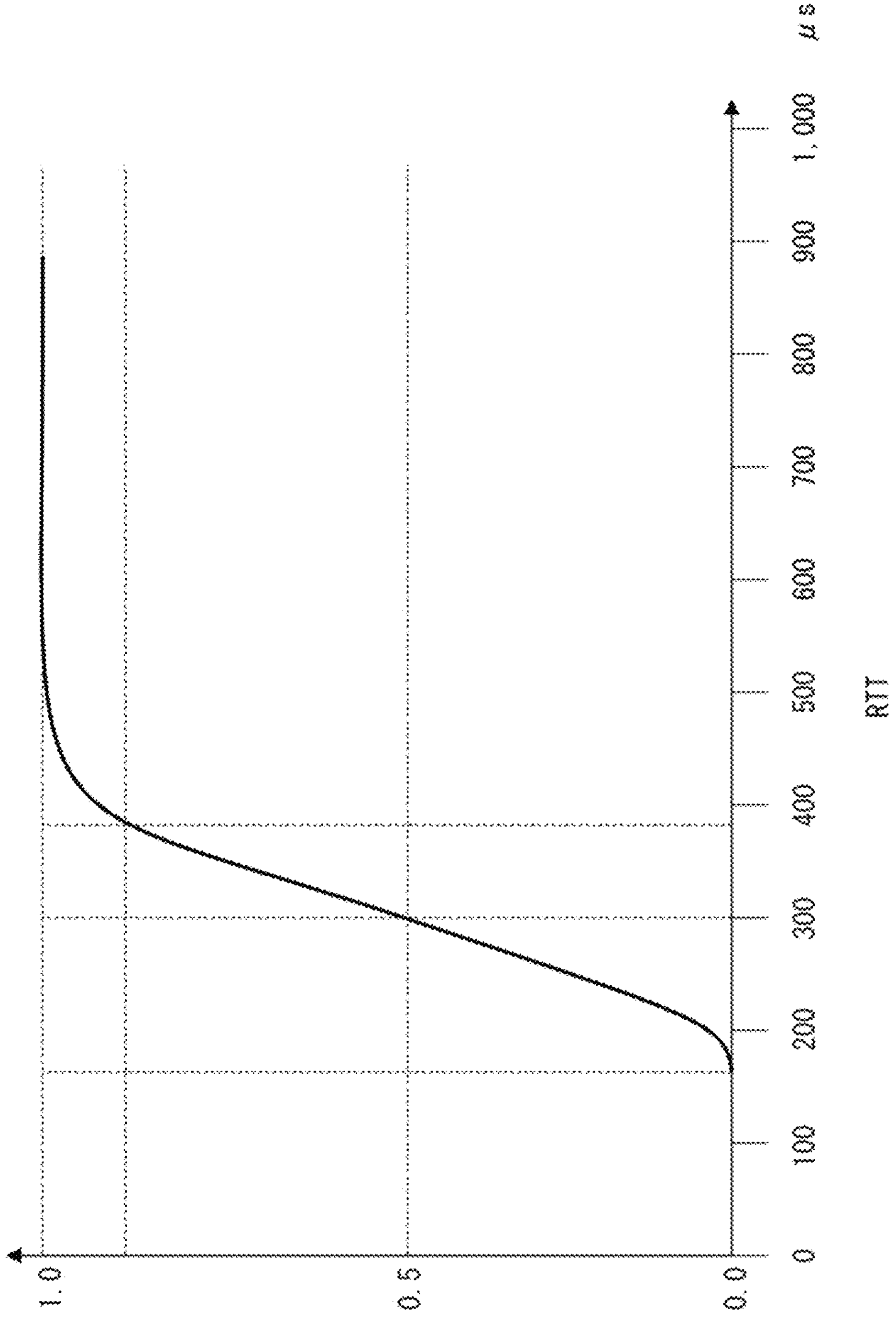
FIG. 3 is a diagram showing an example of communication feature information according to the present example embodiment.

FIG. 3 is a diagram showing an example of communication feature information according to the present example embodiment.

The communication feature information (signature) generated in the present example embodiment represents the relationship between the response times to the pings transmitted by the communication device 1 to the communication device 2, and the cumulative relative frequency using one ping transmission as a transmission unit. That is, as shown in FIG. 3, the communication feature information according to the present example embodiment represents a cumulative relative frequency distribution of the response time RTT (round trip time) from the communication device 1 transmitting a ping until a ping response is received from the communication device 2. In the example of FIG. 3, in the case where the communication device 1 transmits pings to the communication device 2, the response time RTT shows a feature in which the time is distributed between approximately 170 μs to 600 μs. The response time RTT also varies depending on the distance between the communication device 1 and the communication device 2.

FIG. 4 is a functional block diagram of an analysis device according to a first example embodiment.

The analysis device 10 exhibits the functions of a measurement unit 11, a response time calculation unit 12, a signature generation unit 13, a determination unit 14, and an output unit 15. The analysis device 10 includes various storage units, namely a target list storage unit 101, a measurement policy storage unit 102, a measurement result storage unit 103, an identification policy storage unit 104, and a signature storage unit 105.

The measurement unit 11 measures the communication data with the communication device 2 targeted for analysis, that is recorded in the target list storage unit 101 based on a measurement policy that is recorded in the measurement policy storage unit 102.

The response time calculation unit 12 calculates a response time based on the communication data, and stores the response time in the measurement result storage unit 103.

The signature generation unit 13 generates a signature, which is communication feature information relating to the communication device 2, using the measurement results that have been recorded in the measurement result storage unit 103, and records the signature in the signature storage unit 105.

The determination unit 14 uses; a result of comparing the signature generated based on the communication data over a predetermined time period with the communication device 2, and a signature generated based on new communication data over a predetermined time period with the communication device 2, and an identification policy recorded in the identification policy storage unit 104 to determine the presence or absence of a similarity in the signatures.

The output unit 15 outputs a determination result indicating the presence or absence of a change relating to the communication network 100 based on the presence or absence of a similarity in the signatures relating to the communication device 2. In the present example embodiment, the output unit 15 outputs a determination result indicating the presence or absence of a change in the communication device 2 targeted for analysis that constitutes the communication network 100.

The target list storage unit 101 stores a list such as the IP addresses of the communication devices 2 targeted for analysis. As an example, the target list storage unit 101 records an IP address (x.x.x.x) of the communication device 21, and an IP address (y.y.y.y) of the communication device 22.

The measurement policy storage unit 102 stores a measurement policy. A measurement policy records information such as an identifier for specifying a method of measuring the response time.

The measurement result storage unit 103 records a measurement result in which the response times for communication data over a predetermined time period and identification information such as the IP address of the communication device 2 are associated with each other.

The identification policy storage unit 104 records an identifier and the like for specifying the method for determining the presence or absence of a similarity in the communication features based on a comparison between a signature that has been generated in advance for the communication device 2, and a signature that has been newly generated for the communication device 2.

The signature storage unit 105 records the signature that has been generated by the signature generation unit 13 for each communication device 2 in association with an identifier of the communication device 2.

Figure 5:
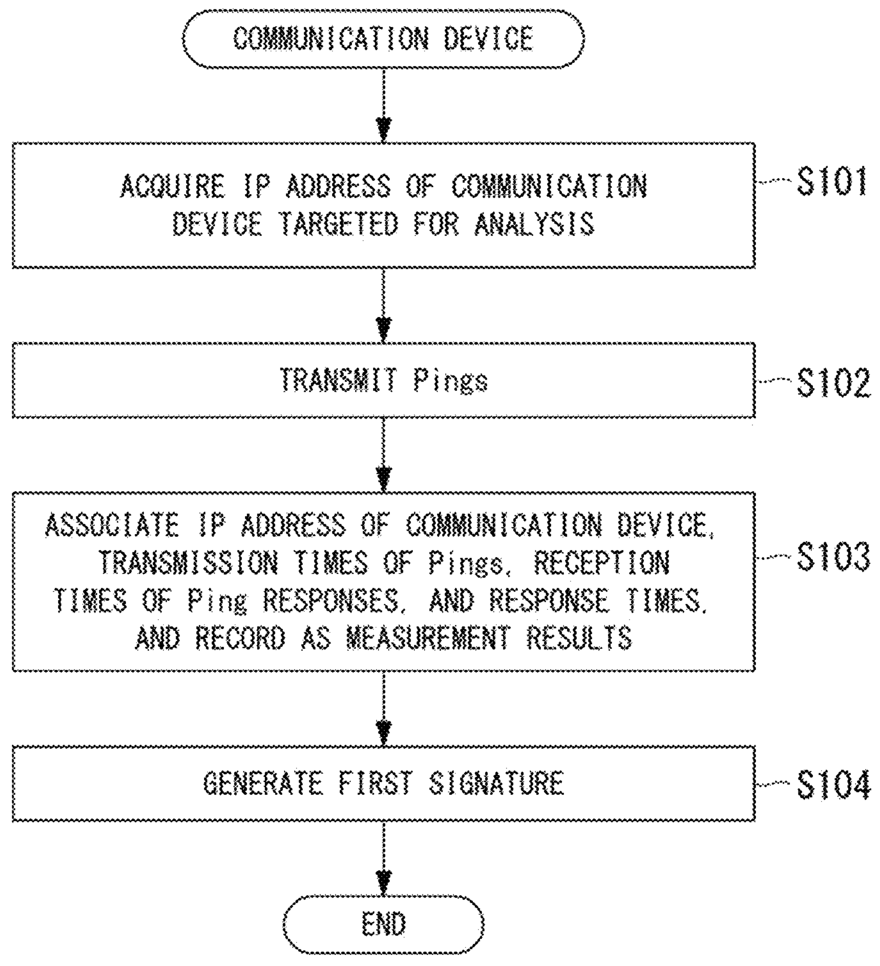
FIG. 5 is a first diagram showing a processing flow performed by an analysis device according to a first example embodiment.

FIG. 5 is a first diagram showing a processing flow performed by the analysis device according to the first example embodiment.

First, the analysis device 10 generates a signature of each of the communication device 2 that is recorded in the target list storage unit 101. Specifically, the measurement unit 11 acquires the IP addresses of the communication devices 2 targeted for analysis from the target list storage unit 101 (step S101). For example, it is assumed that the measurement unit 11 acquires the IP address <x.x.x.x> of the communication device 21. The measurement unit 11 transmits a ping, which is a type of communication data, addressed to the IP address of the communication device 21 (step S102). In the case where the communication device 21 receives the ping, it transmits a ping response to the communication device 1 provided with the analysis device 10. The measurement unit 11 acquires the ping response. The measurement unit 11 outputs the transmission time of the ping and the reception time of the ping response to the response time calculation unit 12. The measurement unit 11 continues to transmit pings, for example, once a second, over a predetermined time period from the measurement start time until the measurement completion time. The predetermined time period from the measurement start time until the measurement completion time may be 3 hours or the like. The measurement unit 11 successively outputs the transmission times of the pings that have been transmitted over the predetermined time period, and the reception times of the ping responses, to the response time calculation unit 12. The response time calculation unit 12 calculates the response time, which represents the interval between the transmission time of a ping and the reception time of a ping response, and stores, as the measurement result, the IP address of the communication device 2, the transmission time of the ping, the reception time of the ping response, and the response time, in association with each other (step S103). As a result, the measurement results for the predetermined time period (3 hours) are recorded in the measurement result storage unit 103. The measurement unit 11 similarly measures the transmission times of the pings and the reception times of the ping responses using the IP addresses of all of the communication devices 2 recorded in the target list storage unit 101, and the response time calculation unit 12 similarly records the measurement results for all of the communication devices 2 in the measurement result storage unit 103.

Figure 6:
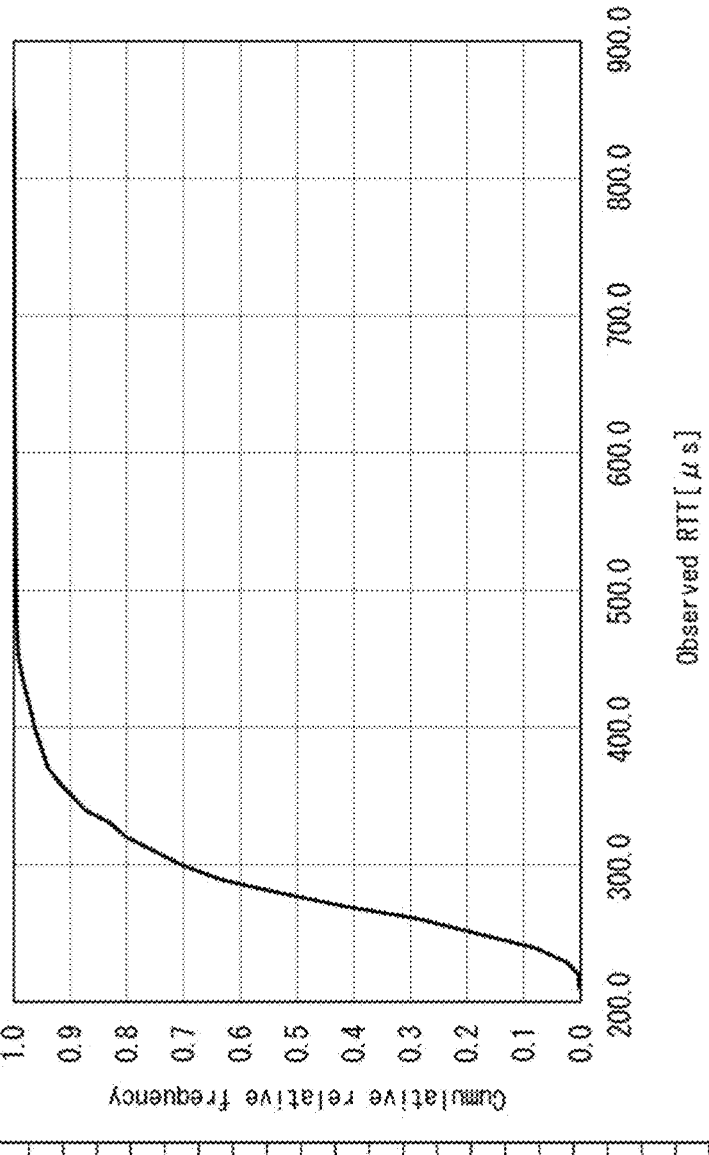
FIG. 6 is a diagram showing a data summary of a signature according to the first example embodiment.

FIG. 6 is a diagram showing a data summary of a signature according to the first example embodiment.

The signature generation unit 13 generates a first signature for each communication device 2 targeted for analysis based on the identification policy acquired from the identification policy storage unit 104 (step S104). More specifically, the signature generation unit 13 is data representing a cumulative relative frequency of ping responses at each ping response time specified at a predetermined interval (for example, 10 μs), which has been generated based on the measurement results of the ping communication over a predetermined time period such as 3 hours (FIG. 6). The signature generation unit 13 associates an identifier such as the IP address of the communication device 2 and the signature, and then stores them in the signature storage unit 105. The identification policy defines, for example, the method of generating a cumulative relative frequency distribution.

Figure 7:
FIG. 7 is a second diagram showing a processing flow performed by the analysis device according to the first example embodiment.

FIG. 7 is a second diagram showing a processing flow performed by the analysis device according to the first example embodiment.

FIG. 8 is a first diagram showing a processing summary of a comparison between a first signature and a second signature according to the first example embodiment.

The analysis device 10 starts analysis processing after the signature of each communication device 2 has been generated (step S201). In the analysis processing, the measurement unit 11 measures the ping transmission times and the reception times of the ping responses for each communication device 2 over a predetermined time period in the same manner as described above. The response time calculation unit 12 similarly calculates the response times relating to the ping transmissions over the predetermined time period, and records the same measurement results in the measurement result storage unit 103 (step S202). The signature generation unit 13 similarly generates a second signature for each communication device 21 at the time of analysis (step S203). The signature generation unit 13 associates the second signature that has been newly generated in the analysis processing and an identifier such as the IP address of the communication device 2, and stores them in the signature storage unit 105 (step S204).

Then, the determination unit 14 acquires the first signature that has been generated in advance for the communication device 2, and the second signature that has been newly generated at the time of analysis, from the signature storage unit 105 (step S205). The determination unit 14 calculates, at each specified response time, the difference between the cumulative relative frequency at each response time specified at a predetermined interval (for example, 10 μs) in the first signature, and the cumulative relative frequency at each response time specified at the same predetermined interval in the second signature, and calculates the sum of the absolute values of the differences (step S206). The determination unit 14 acquires a threshold for determining the presence or absence of a similarity in the signatures, which is recorded in the identification policy storage unit 104. The determination unit 14 determines whether or not the sum of the absolute values of the differences in the cumulative relative frequency at each specified response time is greater than or equal to the threshold (step S207). The determination unit 14 outputs a determination result to the output unit 15 indicating whether or not the sum of the absolute values of the differences in the cumulative relative frequency at each specified response time is greater than or equal to the threshold. The determination unit 14 similarly generates a determination result for each communication device 2 that is stored in the target list storage unit 101, and outputs the determination result to the output unit 15. In the graph in FIG. 8, the solid line 81 represents the relationship between the response time and the cumulative relative frequency based on the first signature, and the dotted line 82 represents the relationship between the response time and the cumulative relative frequency based on the second signature.

Figure 9:
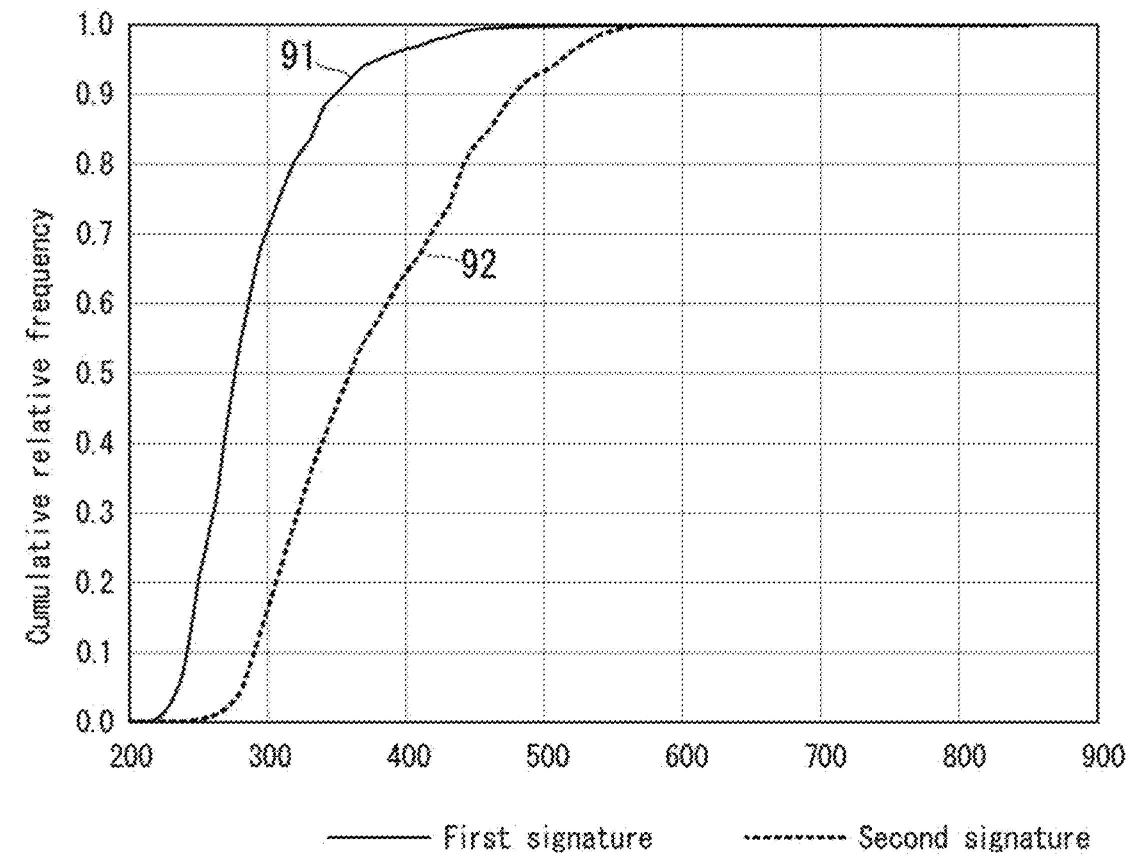
FIG. 9 is a second diagram showing a processing summary of a comparison between a first signature and a second signature.

FIG. 9 is a second diagram showing a processing summary of a comparison between a first signature and a second signature according to the first example embodiment.

In the example shown in FIG. 9, compared to the example shown in FIG. 8, the total value of the absolute values of the differences between the cumulative relative frequency at each response time specified at a predetermined interval (for example, 10 μs) in the first signature (the solid line 91 in the graph in FIG. 9), and the cumulative relative frequency at each response time specified at the same predetermined interval in the second signature (the dotted line 92 in the graph in FIG. 9) is larger. In this case, the total value becomes greater than the threshold. In the case where the sum of the absolute values of the differences between the cumulative relative frequency at each response time specified at a predetermined interval (for example, 10 μs) is greater than or equal to the threshold, the determination unit 14 determines that there is a change in the communication device 2.

Figure 10:
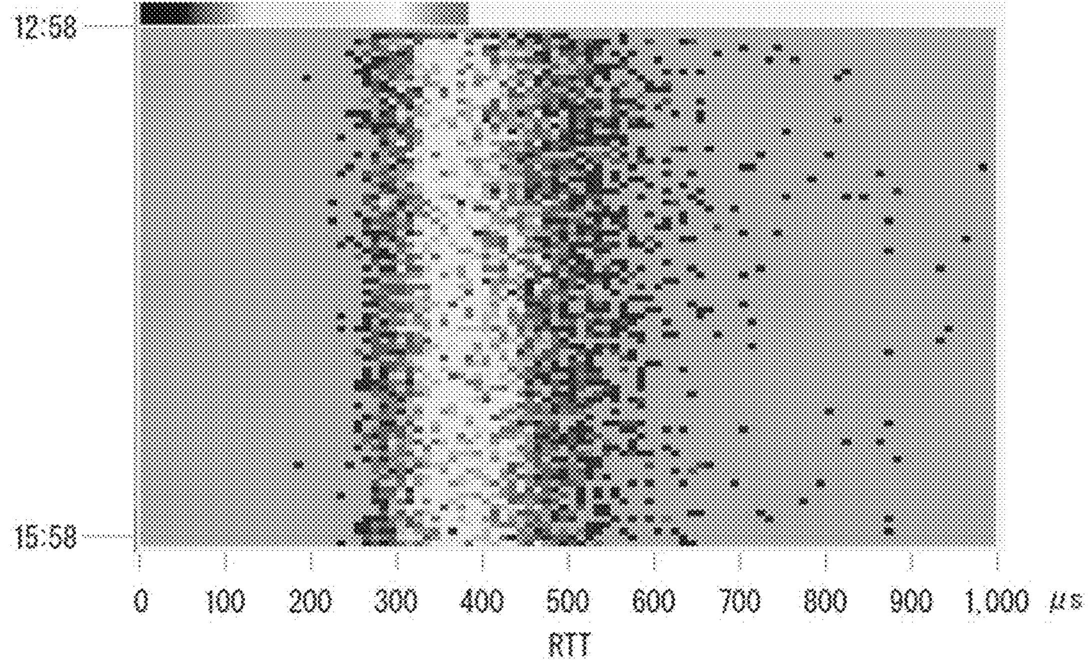
FIG. 10 is a diagram showing an example of output information according to the first example embodiment.

FIG. 10 is a diagram showing an example of output information according to the first example embodiment.

If the determination result is greater than or equal to the threshold, the output unit 15 outputs, to a predetermined device, output information at least containing information indicating that there is a change in the communication device 2 (step S208). If the determination result is less than the threshold, the output unit 15 outputs, to a predetermined device, output information at least containing information indicating that there is no change in the communication device 2 (step S209). The output unit 15 may generate output information containing information indicating that there is a change, or that there is no change, relating to each communication device 2 that is recorded in the target list storage unit 101, and then output the output information to a predetermined device at an output destination. The output unit 15 may generate output information containing visual information using the measurement results used to generate the new signature. The visual information is, for example, information in which the ping response times in a unit time period such as 2 minutes are plotted as dots in a graph in which the vertical axis represents the time from the measurement start time to the measurement completion time, the horizontal axis represents the response times, and the color of the dots represents the number of ping responses that were received at that response time.

According to the processing described above, the analysis device 10 analyzes the change in features of one or more communication devices 2 based on communication feature information called a signature that has been generated based on communication data over a predetermined time period. In the case where the communication feature information of a communication device 2 connected via the communication network 100 changes in a certain time period as the time passes, it is possible that the communication device 2 may have been replaced with a different communication device 2. The analysis device 10 is capable of analyzing such a change based on the communication data.

Second Example Embodiment

Figure 11:
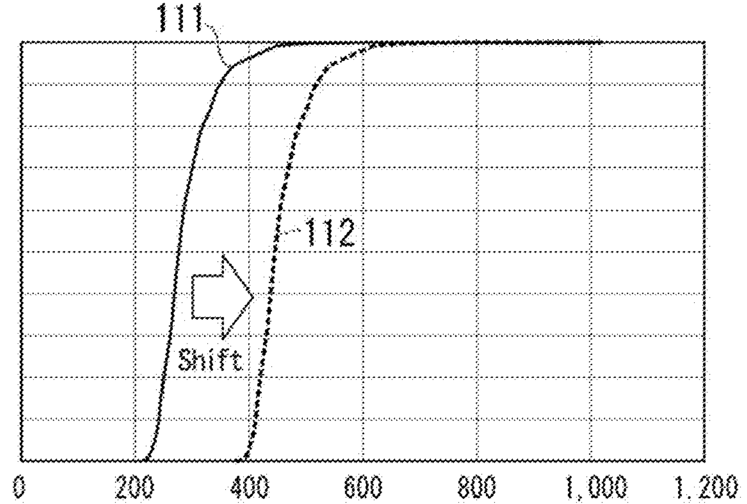
FIG. 11 is a diagram showing a processing summary of a determination unit according to a second example embodiment.

FIG. 11 is a diagram showing a processing summary of a determination unit according to a second example embodiment.

In the processing described above, in the case where the distance to the communication device 2 that is connected via the communication network 100 is different, the analysis device 10 will determine that the signatures are different even if the communication device 2 targeted for analysis at the time of creation of the first signature (the solid line 111 in FIG. 11) and the communication device 2 targeted for analysis at the time of creation of the second signature (the dotted line 112 in FIG. 11) are the same communication device 2. Therefore, the analysis device 10 may perform a shift correction of the response time of the first signature according to the change in distance of the communication device 2, and perform the comparison with the second signature after aligning the response time position at which the cumulative relative frequency starts to rise. Alternatively, the analysis device 10 may perform a shift correction of the response time of the second signature according to the change in distance of the communication device 2, and perform the comparison with the first signature after aligning the response time position at which the cumulative relative frequency starts to rise.

As an example, in the case where a shift correction of the response times of the first signature is performed, the measurement unit 11 acquires a medium velocity Vm of the communication data for the transmission medium between the communication device 1 and the communication device 2 targeted for analysis, from a storage unit or the like. The transmission medium of the communication network 100 that connects the communication device 1 and the communication device 2 is known. Furthermore, the medium velocity Vm of the transmission medium is also known in advance. The measurement unit 11 calculates the distance between the communication device 1 and the communication device 2 by multiplying the medium velocity Vm by (response time R÷2). The measurement unit 11 may calculate the distance a plurality of times based on the response times R from the transmission times of the single pings and the reception times of the ping responses, and determine the average of the distances as the distance between the communication device 1 and the communication device 2. The measurement unit 11 uses a distance A calculated when the first signature was calculated, and a distance B calculated when the second signature was calculated, and calculates a correction time according to the change in the distance by (distance A−distance B)÷medium velocity Vm. Then, by adding or subtracting the correction time to the response times from when the first signature was calculated, the signature generation unit 13 uses the first signature and the second signature calculated in the same manner as in the first example embodiment and corrects the response time when the first signature is generated such that the position of the response time at which the cumulative relative frequencies of the signatures start to rise is matched.

Then, the determination unit 14 uses the first signature and the corrected second signature, and the determination unit 14 outputs to the output unit 15 a determination result indicating whether or not the sum of the absolute values of the differences in the cumulative relative frequency at each specified response time is greater than or equal to the threshold.

As a result, even if the distance between the communication device 1 and the communication device 2 targeted for analysis has changed, the analysis device 10 provided in the communication device 1 is capable of analyzing a change in the communication device 2 that is connected via the communication network 100.

Third Example Embodiment

The analysis device 10 may be a device that analyzes a change in the communication device 2 in the same manner as described above based on log data of the communication data with the communication device 2 targeted for analysis. For example, by storing data containing the past pings and the ping responses, it is possible to analyze a change in the communication device 2 in the same manner as described above. On the other hand, there is a possibility that the responses from the communication device 2 targeted for analysis, such as the ping responses, cannot be obtained from the log data. In this case, the analysis device 10 may use only the communication data transmitted by the device itself to the communication device 2 targeted for analysis to estimate the information corresponding to the response times, and analyze the change in the communicatively connected communication device 2 by performing the processing described in the first example embodiment or the second example embodiment above using the estimated response time.

Figure 12:
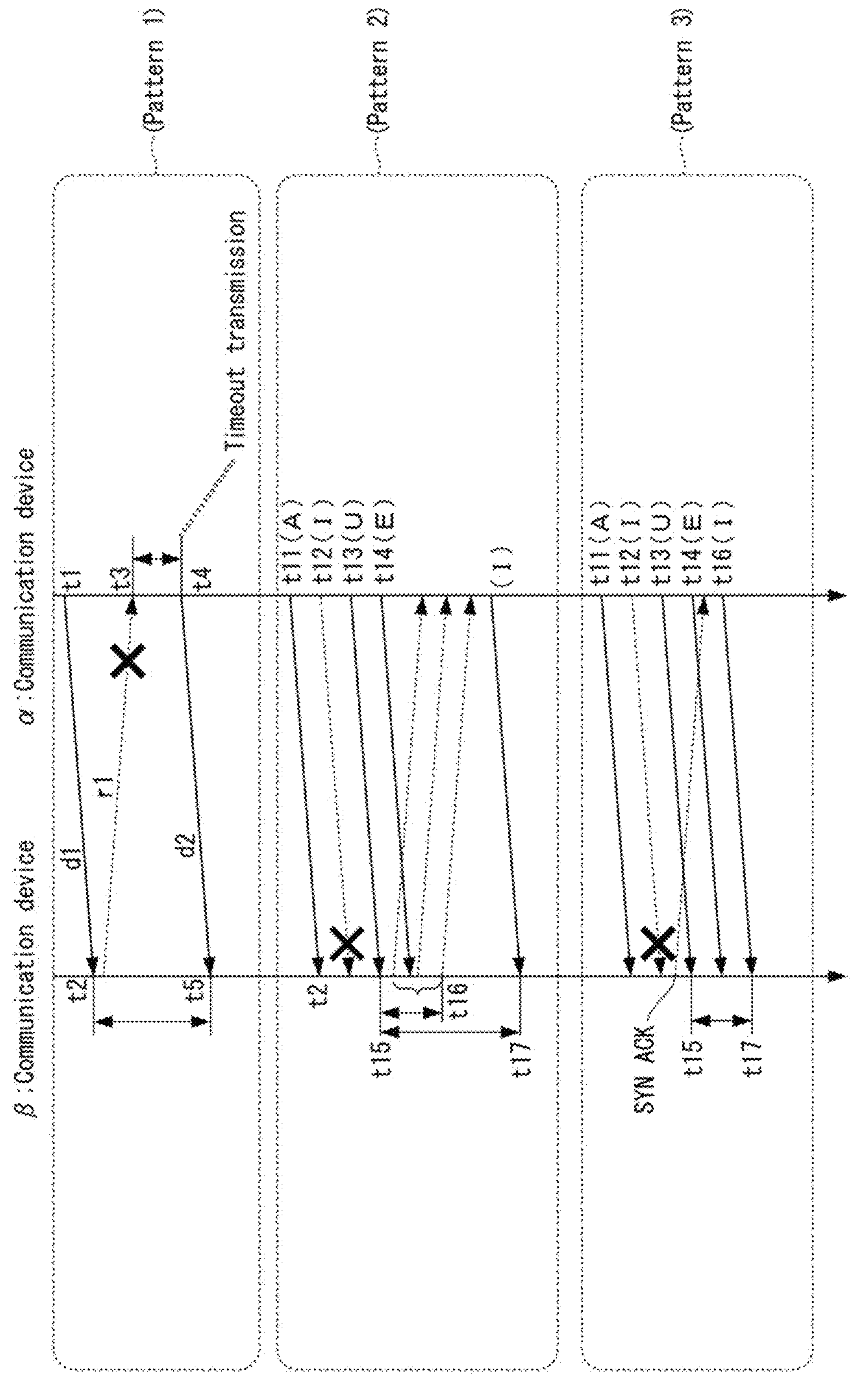
FIG. 12 is a diagram showing a summary of specification processing of information corresponding to a response time according to a third example embodiment.

FIG. 12 is a diagram showing a summary of specification processing of information corresponding to a response time according to a third example embodiment. The response times from the communication device 2 is communication data representing a feature of the communication device 2. However, the analysis device 10 may also generate a signature representing the communication feature of the communication device 2 using communication data other than the response times (RTT). For example, the analysis device 10 may generate a signature using the communication data of a timeout transmission that has been retransmitted due to the occurrence of a timeout in the communication data with the communication device 1.

Specifically, in the case where the communication device 1 transmits communication data and a timeout is transmitted due to the occurrence of packet loss in the communication data, the interval between the transmission time of the first communication data and the retransmission time at which the communication data is retransmitted may be used as feature information of the communication device 2 targeted for analysis. The first pattern (pattern 1) shown in FIG. 12 represents a pattern in the communication data for a case where communication data d1 is transmitted from a communication device α to a communication device β at a time t1 and is received by the communication device β at a time t2. However, the communication device α then detects that a response signal r1 corresponding to the communication data d1 cannot be received at a time t3. After waiting until a time t4, the communication device α transmits communication data d2 to the communication device β at the time t4 due to a timeout, and the communication device β receives the communication data of the timeout transmission at a time t5. In this case, the analysis device 10 and uses the time period obtained by subtracting, from the reception time (t5) of the communication data d2 that is recorded in the log of the communication device β, the waiting time (t4–t2), which is a time period from the reception time (t2) of the communication data d1 until the timeout transmission of the communication device α, as the communication feature information of the communication data between the communication device β and the communication device α, instead of the response times RTT described above, when generating the signature.

Furthermore, as shown in the second pattern (pattern 2), it is assumed that the communication device α successively transmits communication data (communication data (A), (I), (U) and (E)) containing consecutive packets at a time t11, a time t12, a time t13, and a time t14. In a situation where the communication data (A), (I), (U) and (E) is expected to be successively received by the communication device β, if the communication data (U) is received at a time t15 before the communication data (I) is received, the communication device β performs a retransmission request relating to the communication data (I) three times. It is assumed that the transmission time of the final retransmission request of the three retransmission requests by the communication R is at a time t16. As a result, the communication device α retransmits the communication data (I). It is assumed that the communication device β receives the communication data (I) at a time t17. In this case, the analysis device 10 uses the time period obtained by subtracting, from the time period from the reception time t15 of the communication data (U) in the communication device β until the reception time t17 of the retransmitted communication data (I), the time period from the reception time t15 of the communication data (U) until the time t16 of the final retransmission request, as the communication feature information of the communication data between the communication device β and the communication device α, instead of the response times RTT described above, when generating the signature.

In addition, as shown in the third pattern (pattern 3), it is assumed that the communication device α successively transmits communication data (communication data (A), (I), (U) and (E)) containing consecutive packets at a time t11, a time t12, a time t13, and a time t14. In a situation where the communication data (A), (I), (U) and (E) is expected to be successively received by the communication device β, if the communication data (U) is received at a time t15 before the communication data (I) is received, the communication device β performs a retransmission request relating to the communication data (I) by including the resending request in a SYN ACK transmission. The communication device α retransmits the communication data (I) at a time t16 based on the retransmission request of the communication data (I), and the communication data (I) is received by the communication device β at a time t17. In this case, the analysis device 10 uses the time period from the reception time t15 of the communication data (U) in the communication device β until the reception time t17 of the retransmitted communication data (I) as the communication feature information of the communication data between the communication device β and the communication device α, instead of the response times RTT described above, when generating the signature.

In the communication modes of the communication data in the patterns 1 to 3 described above, like the response times RTT, because the time period using the reception time of a retransmission communication due to a timeout represents a feature relating to the communication between two communication devices, it is possible to use the time period instead of the response times RTT when generating the signature.

Fourth Example Embodiment

Figure 13:
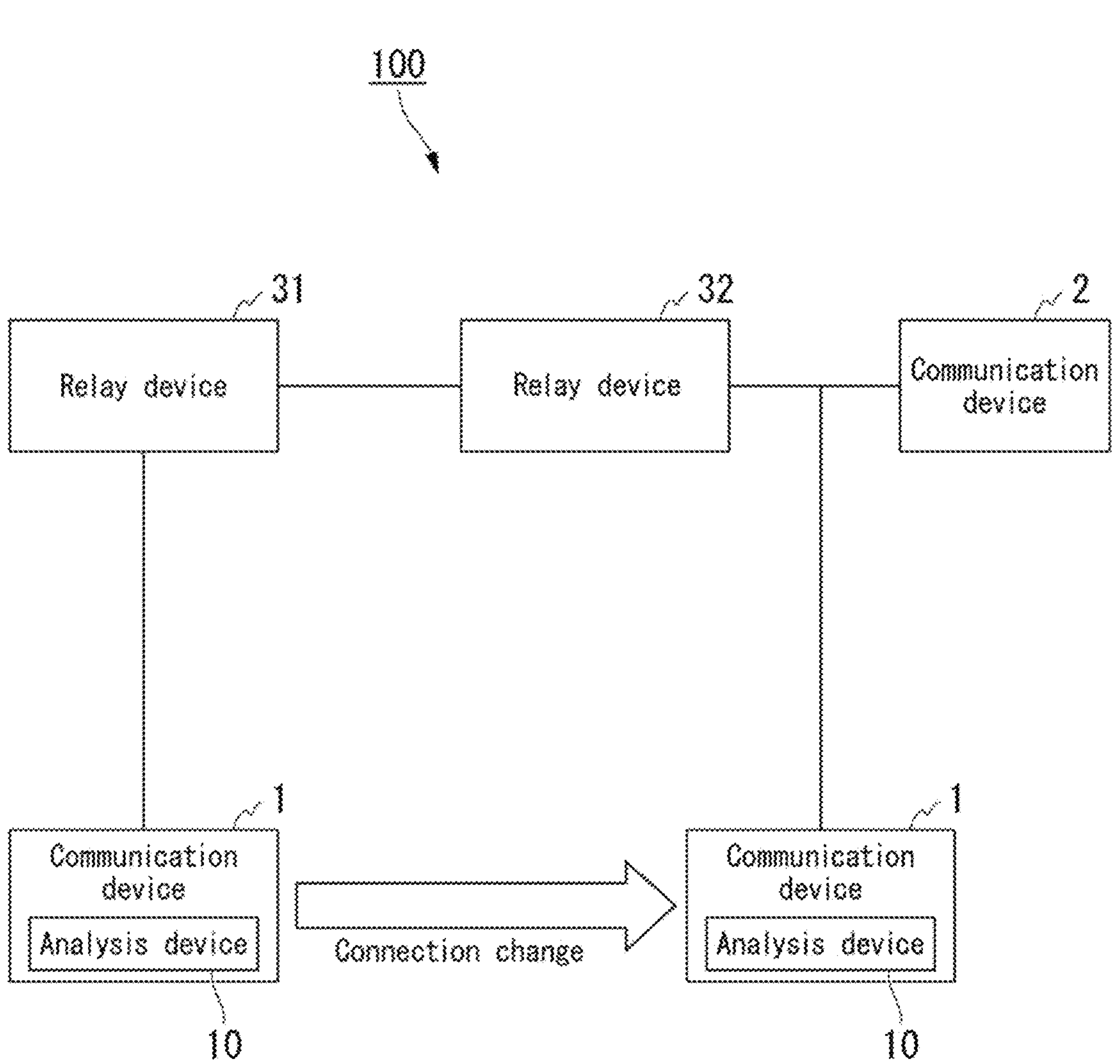
FIG. 13 is a diagram showing a communication network according to a fourth example embodiment.

FIG. 13 is a diagram showing a communication device including an analysis device according to a fourth example embodiment, and a communication network 100 to which the communication device connects. In the communication network 100 shown in FIG. 13, a communication device 1 including an analysis device 10 is communicatively connected to another communication device 2 targeted for analysis via a relay device 31 and a relay device 32. As shown in FIG. 13, in the case where the communication device 1 including the analysis device 10 communicatively connects to the relay device 31 and communicatively connected to the communication device 2 via the relay device 31 and the relay device 32, the analysis device 10 generates a first signature. Furthermore, the communication device 1 including the analysis device 10 changes the connection position to the communication network 100 in FIG. 13 and is connected to the communication network 100 that directly connects the communication device 2 and the relay device 32, it generates a second signature and outputs a determination result indicating the presence or absence of a change relating to the communication network 100.

Figure 14:
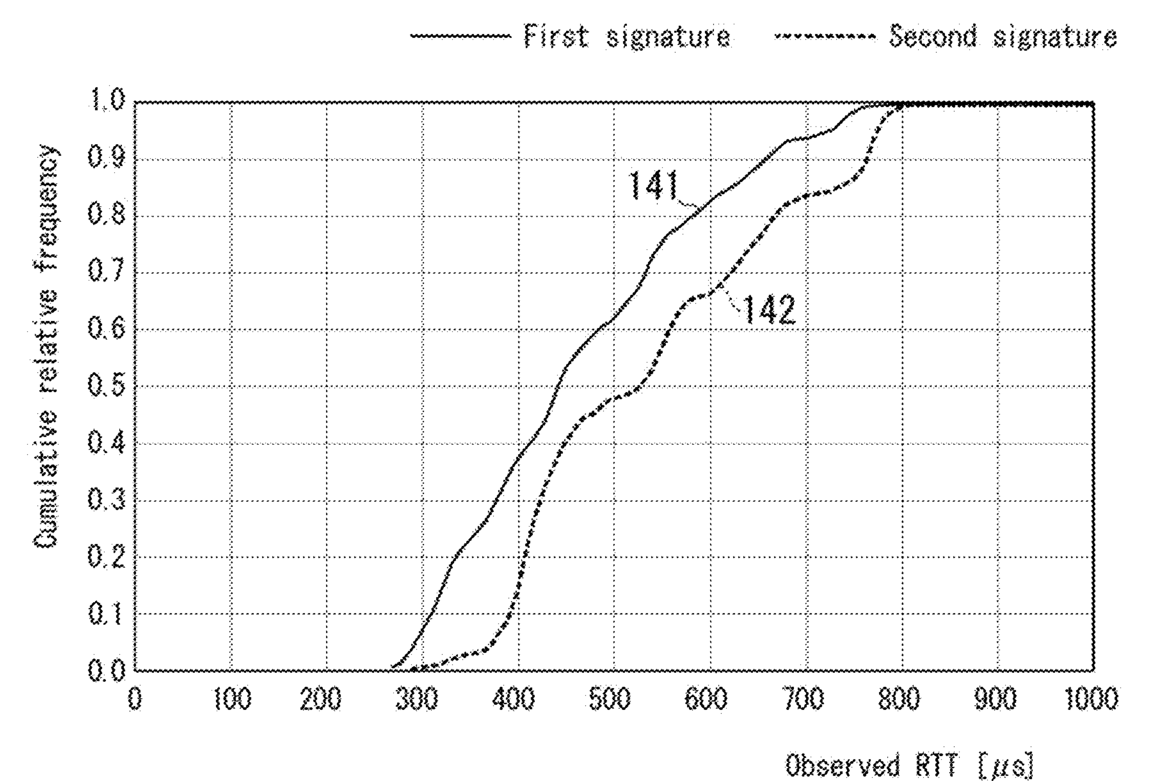
FIG. 14 is a diagram showing a processing summary of a signature comparison in the fourth example embodiment.

FIG. 14 is a diagram showing a processing summary of a signature comparison in the fourth example embodiment.

The determination unit 14 of the analysis device 10 compares a first signature generated before a connection change to the communication network 100, and a second signature generated after the connection change as shown in FIG. 13. That is to say, the determination unit 14 acquires the first signature that has been generated in advance for the communication device 2, and the second signature that has been newly generated at the time of analysis, from the signature storage unit 105. The determination unit 14 calculates, for each specified response time, the difference between the cumulative relative frequency (the solid line 141 in the graph in FIG. 14) at each response time specified at a predetermined interval (for example, 10 μs) in the first signature, and the cumulative relative frequency (the dotted line 142 in the graph in FIG. 14) at each response time specified at the same predetermined interval in the second signature, and calculates the sum of the absolute values of the differences (FIG. 14). The determination unit 14 acquires a threshold for determining the presence or absence of a similarity in the signature that is recorded in the identification policy storage unit 104. The determination unit 14 determines whether or not the sum of the absolute values of the differences in the cumulative relative frequency at each specified response time is greater than or equal to the threshold. The determination unit 14 outputs to the output unit 15 a determination result indicating whether or not the sum of the absolute values of the differences in the cumulative relative frequency at each specified response time is greater than or equal to the threshold. The determination unit 14 similarly generates a determination result for each communication device 2 among the devices constituting the communication network 100, which is recorded in the target list storage unit 101, and outputs the determination result to the output unit 15.

As a result of such processing, the analysis device 10 is capable of determining the presence or absence of a change in the case where the connection position of the communication device 1 to the communication network 100 has been changed, or in the case where another communication device 2 constituting the communication network 100 has changed. The determination unit 14 of the analysis device 10 may determine the presence or absence of a similarity in the signatures based on graph shape recognition of each of the first signature and the second signature, which represent the relationship between the time and the cumulative relative frequency relating to communication data that has been transmitted a plurality of times to another communication device.

Figure 15:
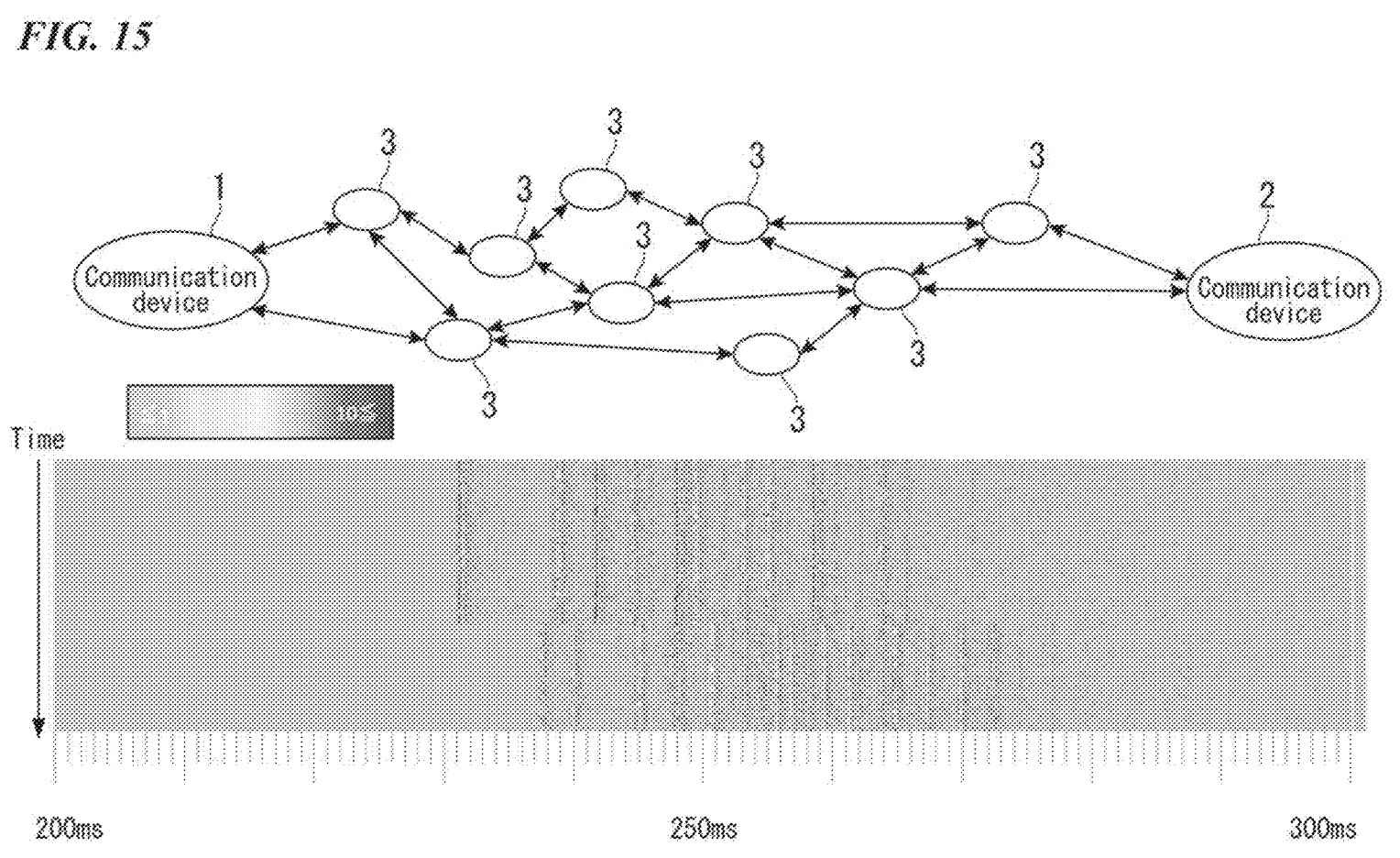

FIG. 15 is a diagram showing an example of visual information included in output information according to the fourth example embodiment.

In the case where a plurality of relay devices 3 are present on the communication network 100, to which the communication device 1 communicatively connects, the relay devices 3 that relay each packet of the communication with a partner communication device 2 may be different. This is considered to be due to a load balancer function or the like in each relay device 3, which causes the relay device β at an assigned destination on the communication network 100 to be different. In this case, the visual information shown in FIG. 10 forms a striped pattern such as that shown in FIG. 15. If the communication path is different in the case where a ping is transmitted from the communication device to the communication device 2, the response time also changes. Therefore, it is expected that the visual information output by the analysis device 10 of the communication device 1 will form a striped pattern such as that in FIG. 15. The striped pattern changes at a certain timing. This is expected to be because the relay devices 3 have caused a path changing algorithm to change due to a load balancer function or the like. The analysis device 10 may determine the presence or absence of a change relating to the communication network 100 by detecting such a change in the visual information.

FIG. 16 is a diagram showing an example of output information according to the fourth example embodiment.

Like the output information shown in FIG. 10, in the fourth example embodiment, in the case where the sum of the absolute values of the differences in the cumulative relative frequency at each response time, being a determination result of a certain communication device 2 constituting the communication network 100, is greater than or equal to a threshold, the output unit 15 outputs, to a predetermined device, output information at least containing information indicating that there is a change in the communication device 2. If the determination result is less than the threshold, the output unit 15 outputs, to a predetermined device, output information at least containing information indicating that there is no change in the communication device 2. The output unit 15 may generate output information containing information indicating that there is a change, or that there is no change, relating to each communication device 2 that is recorded in the target list storage unit 101, and then output the output information to a predetermined device at an output destination. The output unit 15 may generate output information (FIG. 16) containing visual information using the measurement results used to generate the new signature. Furthermore, in the fourth example embodiment, the output unit 15 of the analysis device 10 may generate output information to which information indicating whether or not there is a change in the communication network 100 as a whole is added, based on a change in the visual information (FIG. 16).

According to the processing described above, the analysis device 10 is capable of analyzing a change in the features of the communication network 100 (network configuration) based on communication feature information called a signature that has been generated based on communication data over a predetermined time period. In the case where the communication feature information of one of the communication devices 2 constituting the communication network 100 that is connected via the communication network 100 changes in a certain time period as the time passes, it is possible that the communication device 2 constituting the communication network 100 that is showing the change has been replaced with a different device. The analysis device 10 is capable of analyzing such a change based on the communication data.

Figure 17:
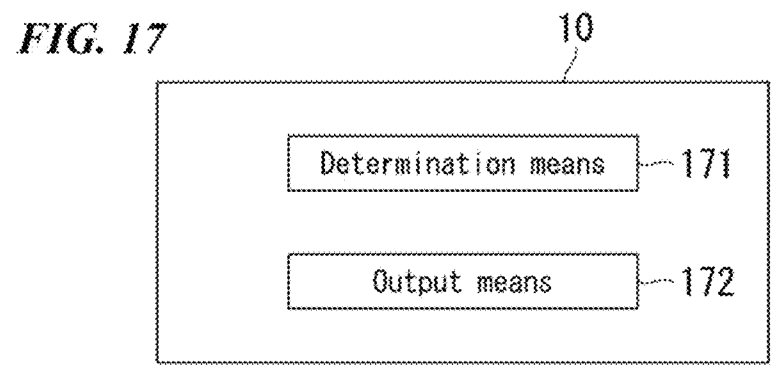
FIG. 17 is a diagram showing a minimum configuration of an analysis device according to the present example embodiment.

FIG. 17 is a diagram showing a minimum configuration of an analysis device.

Figure 18:
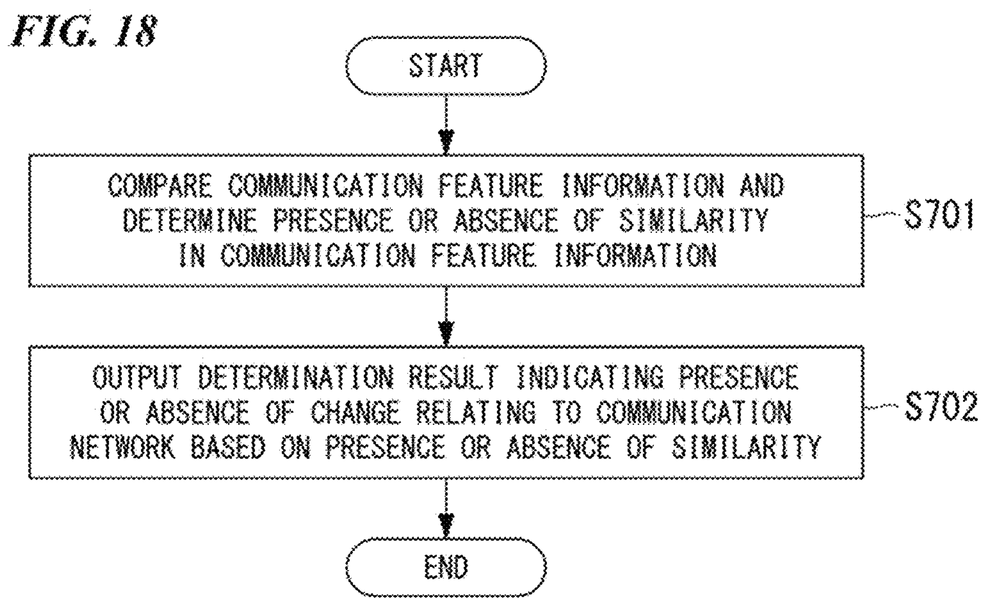
FIG. 18 is a diagram showing a processing flow of the analysis device of the minimum configuration according to the present example embodiment.

FIG. 18 is a diagram showing a processing flow of the analysis device of the minimum configuration.

The analysis device 10 includes at least a determination means 171 and an output means 172.

The determination means 171 compares first communication feature information that has been generated based on communication data over a predetermined time period with another communication device that is connected to the communication network 100, and second communication feature information that has been generated based on new communication data over a predetermined time period with the other communication device that is connected to the communication network 100, and determines the presence or absence of a similarity in the communication feature information (step S701).

The output means 172 outputs a determination result indicating the presence or absence of a change relating to the communication network 100 based on the presence or absence of the similarity (step S702).

(Hardware Configuration)

Figure 19:
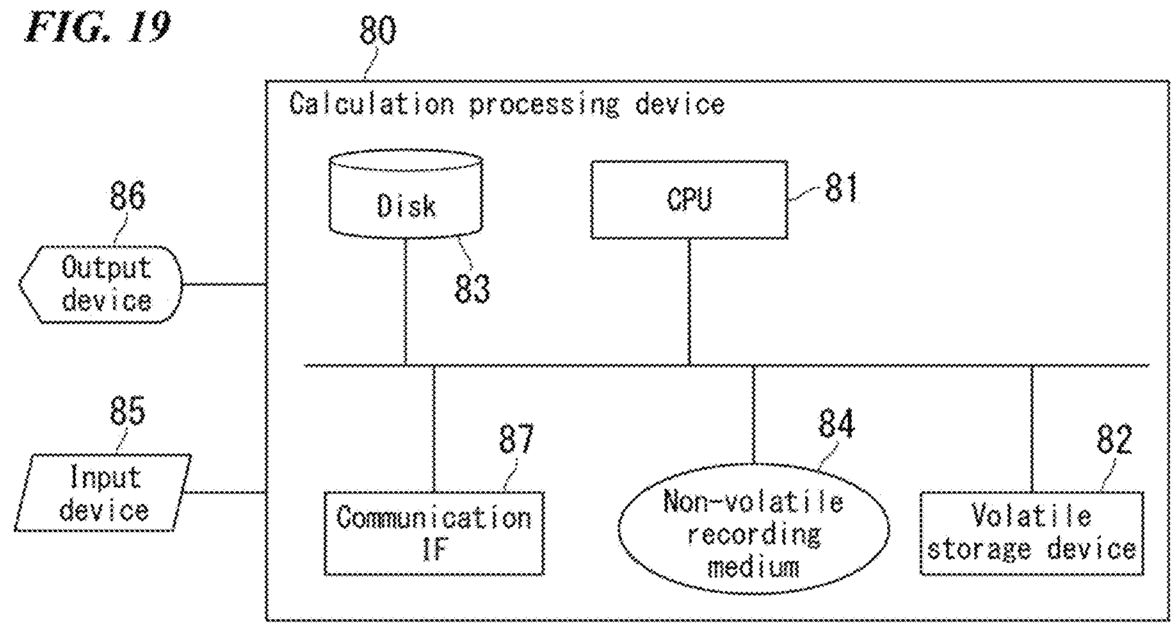
FIG. 19 is a block diagram schematically showing a hardware configuration example of a calculation processing device which is capable of realizing the analysis device according to the present example embodiment.

FIG. 19 is a block diagram schematically showing a hardware configuration example of a calculation processing device 80, which is capable of realizing the analysis device 10 according to the example embodiments of the present invention.

A configuration example of hardware resources that realize the analysis device 10 using a single calculation processing device (an information processing device, or a computer) will be described. However, the analysis device 10 may be physically or functionally realized using at least two calculation processing devices. Furthermore, the analysis device 10 may be realized as a dedicated device.

The calculation processing device 80 includes a central processing computation device (central processing unit, referred to as "CPU" below) 81, a volatile storage device 82, a disk 83, a non-volatile recording medium 84, and a communication interface (referred to as "communication IF" below) 87. The calculation processing device 80 may also be capable of being connected to an input device 85 and an output device 86. The calculation processing device 80 is capable of transmitting and receiving information to and from other calculation processing devices and other communication devices via the communication IF 87.

The non-volatile recording medium 84 is, for example, a computer-readable compact disc (CD) or digital versatile disc (DVD). Furthermore, the non-volatile recording medium 84 may be a universal serial bus memory (USB memory), a solid state drive (SSD), or the like. The non-volatile recording medium 84 retains the program without supplying power, and allows the program to be transported. The non-volatile recording medium 84 is not limited to the media mentioned above. Further, instead of the non-volatile recording medium 84, the program may be transported via the communication IF 87 and the communication network 100.

The volatile storage device 82 is computer readable and can temporarily store data. The volatile storage device 82 is a memory or the like, such as a dynamic random access memory (DRAM) or a static random access memory (SRAM).

That is to say, the CPU 81 copies the software program (computer program, hereinafter simply referred to as "program") that is stored on the disk 83 to the volatile storage device 82 at the time of execution, and executes computation processing. The CPU 81 reads the data required for program execution from the volatile storage device 82. In the case where a display is required, the CPU 81 displays the output result on the output device 86. In the case where a program is input from the outside, the CPU 81 reads the program from the input device 85. The CPU 81 interprets and executes an analysis program (FIG. 4 or FIG. 5) stored in the volatile storage device 82 that corresponds to the functions (processing) represented by each of the units shown in FIG. 2 (or FIG. 3). The CPU 81 executes the processing described in each of the example embodiments of the present invention described above. That is to say, in such a case, each of the example embodiments of the present invention can be considered to be achieved by such an analysis program. Further, each of the example embodiments of the present invention can be considered to be achieved by a computer-readable non-volatile recording medium on which such an analysis program is recorded.

The present invention has been described above using the example embodiments as model examples. However, the present invention is not limited to the example embodiments described above. That is to say, in the present invention, various aspects that can be understood by those skilled in the art can be applied within the scope of the present invention.

DESCRIPTION OF REFERENCE SYMBOLS

100 Communication network
1, 2, 21, 22 Communication device
3, 31, 32 Relay device
4 Switch
11 Measurement unit
12 Response time calculation unit
13 Signature generation unit
14 Determination unit (determination means 171)
15 Output unit (output means 172)
101 Target list storage unit
102 Measurement policy storage unit
103 Measurement result storage unit
104 Identification policy storage unit
105 Signature storage unit

What is claimed is:

1. An analysis device comprising:

a memory configured to store instructions;

a processor configured to execute the instructions to:

compare first communication feature information and second communication feature information to determine a presence or absence of a similarity in the communication feature information, wherein the first communication feature information has been generated based on communication data that has been transmitted a plurality of times over a predetermined time period with another communication device that is connected to a communication network, the first communication feature information represents a feature of a relationship between a time period from transmitting the communication data to the other communication device until receiving a response to the communication data, and a cumulative relative frequency thereof, the second communication feature information has been generated based on new communication data that has been transmitted a plurality of times over the predetermined time period with the other communication device that is connected to the communication network, and the second communication feature information represents a feature of a relationship between a time period from transmitting the communication data to the other communication device until receiving a response to the communication data, and a cumulative relative frequency thereof; and output a determination result indicating a presence or absence of a change relating to the communication network based on the presence or absence of the similarity, wherein comparing the first communication feature information and the second communication feature information to determine the presence or absence of the similarity comprises:

determining the presence or absence of the similarity in the communication feature information based on whether or not a sum of differences in a time period corresponding to the cumulative relative frequency indicated by each of the first communication feature information and the second communication feature information is greater than or equal to a threshold.

2. The analysis device according to claim 1, wherein the processor is configured to execute the instructions to output a determination result indicating a presence or absence of a change relating to the other communication device that is connected via the communication network based on the presence or absence of the similarity.

3. The analysis device according to claim 1, wherein the processor is configured to execute the instructions to output a determination result indicating a presence or absence of a change relating to a network configuration of the communication network based on the presence or absence of the similarity.

4. An analysis method comprising:

comparing first communication feature information and second communication feature information to determine a presence or absence of a similarity in the communication feature information, wherein the first communication feature information has been generated based on communication data that has been transmitted a plurality of times over a predetermined time period with another communication device that is connected to a communication network, the first communication feature information represents a feature of a relationship between a time period from transmitting the communication data to the other communication device until receiving a response to the communication data, and a cumulative relative frequency thereof, the second communication feature information has been generated based on new communication data that has been transmitted a plurality of times over the predetermined time period with the other communication device that is connected to the communication network, and the second communication feature information represents a feature of a relationship between a time period from transmitting the communication data to the other communication device until receiving a response to the communication data, and a cumulative relative frequency thereof; and outputting a determination result indicating a presence or absence of a change relating to the communication network based on the presence or absence of the similarity, wherein comparing the first communication feature information and the second communication feature information to determine the presence or absence of the similarity comprises:

determining the presence or absence of the similarity in the communication feature information based on whether or not a sum of differences in a time period corresponding to the cumulative relative frequency indicated by each of the first communication feature information and the second communication feature information is greater than or equal to a threshold.

5. A non-transitory storage medium that stores a program that causes a computer of an analysis device to execute:

comparing first communication feature information and second communication feature information to determine a presence or absence of a similarity in the communication feature information, wherein the first communication feature information has been generated based on communication data that has been transmitted a plurality of times over a predetermined time period with another communication device that is connected to a communication network, the first communication feature information represents a feature of a relationship between a time period from transmitting the communication data to the other communication device until receiving a response to the communication data, and a cumulative relative frequency thereof, the second communication feature information has been generated based on new communication data that has been transmitted a plurality of times over the predetermined time period with the other communication device that is connected to the communication network, and the second communication feature information represents a feature of a relationship between a time period from transmitting the communication data to the other communication device until receiving a response to the communication data, and a cumulative relative frequency thereof; and outputting a determination result indicating a presence or absence of a change relating to the communication network based on the presence or absence of the similarity, wherein comparing the first communication feature information and the second communication feature information to determine the presence or absence of the similarity comprises:

determining the presence or absence of the similarity in the communication feature information based on whether or not a sum of differences in a time period corresponding to the cumulative relative frequency indicated by each of the first communication feature information and the second communication feature information is greater than or equal to a threshold.

6. The analysis method according to claim 4, wherein a determination result is output which indicates a presence or absence of a change relating to the other communication device that is connected via the communication network based on the presence or absence of the similarity.

7. The analysis method according to claim 4, wherein a determination result is output which indicates a presence or absence of a change relating to a network configuration of the communication network based on the presence or absence of the similarity.

8. The non-transitory storage medium according to claim 5, wherein a determination result is output which indicates a presence or absence of a change relating to the other communication device that is connected via the communication network based on the presence or absence of the similarity.

9. The non-transitory storage medium according to claim 5, wherein a determination result is output which indicates a presence or absence of a change relating to a network configuration of the communication network based on the presence or absence of the similarity.

* * * * *